United States Patent
Srinivas et al.

(10) Patent No.: US 10,614,007 B2
(45) Date of Patent: Apr. 7, 2020

(54) PROVIDING INTERRUPT SERVICE ROUTINE (ISR) PREFETCHING IN MULTICORE PROCESSOR-BASED SYSTEMS

(71) Applicant: QUALCOMM Incorporated, San Diego, CA (US)

(72) Inventors: Raghavendra Srinivas, Bangalore (IN); Kaustav Roychowdhury, Bangalore (IN); Siddesh Halavarthi Math Revana, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/958,438

(22) Filed: Apr. 20, 2018

(65) Prior Publication Data

US 2019/0324932 A1 Oct. 24, 2019

(51) Int. Cl.
*G06F 13/24* (2006.01)
*G06F 9/38* (2018.01)
(Continued)

(52) U.S. Cl.
CPC ............ *G06F 13/24* (2013.01); *G06F 9/3802* (2013.01); *G06F 9/4812* (2013.01); *G06F 9/544* (2013.01);
(Continued)

(58) Field of Classification Search
CPC ................................ G06F 9/3802; G06F 13/24
See application file for complete search history.

(56) References Cited

U.S. PATENT DOCUMENTS 7,266,824 B2  9/2007  Chauvel
7,340,573 B2  3/2008  Watt
(Continued)

FOREIGN PATENT DOCUMENTS

EP  0747873 A1  12/1996

OTHER PUBLICATIONS

International Search Report and Written Opinion for International Patent Application No. PCT/US2019/026839, dated Jul. 1, 2019, 20 pages.

(Continued)

*Primary Examiner* — Zachary K Huson
(74) *Attorney, Agent, or Firm* — Withrow & Terranova, PLLC

(57) ABSTRACT

Providing interrupt service routine (ISR) prefetching in multicore processor-based systems is disclosed. In one aspect, a multicore processor-based system provides an ISR prefetch control circuit communicatively coupled to an interrupt controller and a plurality of instruction fetch units (IFUs) of a corresponding plurality of processor elements (PEs). Upon receiving an interrupt directed to a target PE of the plurality of PEs, the interrupt controller provides an interrupt request (IRQ) identifier to the ISR prefetch control circuit. Based on the IRQ identifier, the ISR prefetch control circuit fetches an ISR pointer to an ISR corresponding to the IRQ identifier. The ISR prefetch control circuit next selects a prefetch PE of the plurality of PEs to perform a prefetch operation to retrieve the ISR on behalf of the target PE, and provides an ISR prefetch request, including the ISR pointer, to an IFU of the prefetch PE.

23 Claims, 9 Drawing Sheets

(51) Int. Cl.
 G06F 9/48 (2006.01)
 G06F 11/30 (2006.01)
 G06F 12/084 (2016.01)
 G06F 11/34 (2006.01)
 G06F 9/54 (2006.01)
(52) U.S. Cl.
 CPC ...... *G06F 11/3017* (2013.01); *G06F 11/3409* (2013.01); *G06F 12/084* (2013.01)

(56) References Cited

U.S. PATENT DOCUMENTS

| | | |
|---|---|---|
| 8,626,890 B2 | 1/2014 | Colrain et al. |
| 8,738,860 B1 | 5/2014 | Griffin et al. |
| 9,003,421 B2 | 4/2015 | Gabor et al. |
| 2011/0283067 A1 | 11/2011 | Chen et al. |
| 2014/0258629 A1* | 9/2014 | Busaba ............... G06F 12/0862 711/130 |
| 2017/0139863 A1* | 5/2017 | Robertson ............... G06F 13/34 |

OTHER PUBLICATIONS

Kamruzzaman, M. et al., "Inter-Core Prefetching for Multicore Processors Using Migrating Helper Threads," Sixteenth International Conference on Architectural Support for Programming Languages and Operating Systems (ASPLOS '11), Mar. 5-11, 2011, Newport Beach, CA, USA, ACM, pp. 393-404.

* cited by examiner

PROVIDING INTERRUPT SERVICE ROUTINE (ISR) PREFETCHING IN MULTICORE PROCESSOR-BASED SYSTEMS

BACKGROUND

I. Field of the Disclosure

The technology of the disclosure relates generally to interrupt handling for multicore processor-based systems, and, in particular, to providing prefetching of interrupt service routines (ISRs).

II. Background

In conventional multicore processor-based systems, processors are made aware of system events requiring immediate attention through the use of signals known as interrupts. Upon receiving an interrupt, such processor-based systems identify a source of the interrupt and execute a corresponding interrupt service routine (ISR) to handle the underlying system event that caused the interrupt. By nature, the occurrence of an interrupt generally cannot be determined beforehand, and thus an interrupt may be received by a processor core at an unpredictable or inconvenient time (e.g., during execution of higher priority tasks by the processor core). Consequently, it is desirable to optimize interrupt handling so that the interrupt can be serviced as quickly as possible to minimize the disruption of tasks being executed by an interrupted processor core. In particular, the impact of interrupt handling on processor performance may be minimized by reducing interrupt latency (the time from interrupt generation to execution of a first instruction at an exception address), interrupt response time (the time from interrupt generation to execution of the first instruction in a corresponding ISR), ISR execution time (the time required for the processor to execute the ISR), and interrupt recovery time (the time between execution of a last instruction in the ISR and resumption of normal processing).

However, in conventional multicore processor-based systems, a number of issues may contribute to reduced interrupt handling performance. If a processor core that is in a low-power (or "collapsed") mode receives an interrupt, handling of the interrupt will be delayed while the processor core is woken up to service the interrupt. Execution of an ISR for a given interrupt may be further delayed due to the need to first execute a top-level exception handler to identify the specific ISR to execute for the particular interrupt received. For instance, the top-level exception handler may include a context-saving operation that may cause a considerable delay. Additional delay in servicing the interrupt may also be incurred if the instructions constituting the ISR for the interrupt are not present within an instruction cache at the time the interrupt is received. In such a case, the ISR must be fetched from system memory, which requires a memory management unit (MMU) table walk. Further latency may be encountered in processor cores that are configured to treat the interrupt as non-nestable and/or non-deferrable, in which case execution of the ISR corresponding to the interrupt must complete before the processor core can resume normal processing.

In some instances, interrupt handling performance may be improved through the use of nestable interrupts, which allow a processor core to intervene during the servicing of a lower priority interrupt to allow a higher priority interrupt to be handled. However, nestable interrupts may not result in increased processor performance if the handling of the lower priority interrupt must complete before the processor core can resume its normal tasks. Another technique to improve interrupt handling performance involves permanently placing a subset of ISRs that are designated as critical in cache memory to avoid having to fetch the ISRs from a higher-level cache memory or from system memory. This approach, though, either reduces the cache memory available for caching other instructions or data, or adds to the area, overhead, and power consumption of cache memory if the cache memory is increased in size to accommodate the critical ISRs.

SUMMARY OF THE DISCLOSURE

Aspects disclosed in the detailed description include providing interrupt service routine (ISR) prefetching in multicore processor-based systems. In this regard, in some aspects, a multicore processor-based system provides an ISR prefetch control circuit that is communicatively coupled to an interrupt controller and to a plurality of instruction fetch units (IFUs) of a corresponding plurality of processor elements (PEs) (e.g., processor devices or processor cores, as non-limiting examples). Upon receiving an interrupt directed to a PE of the plurality of PEs (i.e., a "target" PE), the interrupt controller provides an interrupt request (IRQ) identifier to the ISR prefetch control circuit. Based on the IRQ identifier, the ISR prefetch control circuit fetches an ISR pointer indicating a starting address for an ISR corresponding to the IRQ identifier. The ISR prefetch control circuit next selects one of the PEs of the plurality of PEs as a "prefetch" PE to perform a prefetch operation to retrieve the ISR on behalf of the target PE. The prefetch PE, for example, may be a PE of the plurality of PEs that has a less intense processing load than other PEs, which allows the otherwise unused performance margin of the prefetch PE to be put to productive use. The ISR prefetch control circuit then provides an ISR prefetch request, which includes the ISR pointer and a prefetch start signal, to an instruction fetch unit (IFU) of the prefetch PE. In some aspects, an ISR prefetch circuit is provided to receive the ISR prefetch request, prefetch the ISR, and store the ISR in a shared cache for later retrieval and execution by the target PE. The ISR prefetch circuit in some aspects may be integrated into the IFU of the prefetch PE, integrated into a memory management unit (MMU) and/or a translation lookaside buffer (TLB), or provided as a separate, independent element of the multicore processor-based system. The ISR prefetch request according to some aspects may also include a prefetch depth indicator that indicates to the IFU how many instruction lines to fetch. In this manner, the latency involved with fetching the ISR is reduced or eliminated from the overall interrupt service handling time, resulting in improved system performance.

In another aspect, a multicore processor-based system for providing ISR prefetching is provided. The multicore processor-based system comprises an interrupt controller, and further comprises a plurality of processor elements (PEs) comprising a corresponding plurality of IFUs. The multicore processor-based system also comprises an ISR prefetch control circuit communicatively coupled to the interrupt controller and to the plurality of IFUs. The ISR prefetch control circuit is configured to receive, from the interrupt controller, an IRQ identifier corresponding to an interrupt directed to a target PE of the plurality of PEs. The ISR prefetch control circuit is further configured to fetch an ISR pointer for an ISR corresponding to the IRQ identifier. The ISR prefetch control circuit is also configured to select a prefetch PE from the plurality of PEs to perform an ISR prefetch on behalf of the target PE. The ISR prefetch control circuit is additionally configured to provide an ISR prefetch request, comprising a prefetch start signal and the ISR pointer, to an IFU of the prefetch PE.

In another aspect, a multicore processor-based system for providing ISR prefetching is provided. The multicore processor-based system comprises a means for receiving an IRQ identifier corresponding to an interrupt directed to a target PE of a plurality of PEs. The multicore processor-based system further comprises a means for fetching an ISR pointer for an ISR corresponding to the IRQ identifier. The multicore processor-based system also comprises a means for selecting a prefetch PE from the plurality of PEs to perform an ISR prefetch on behalf of the target PE. The multicore processor-based system additionally comprises a means for providing an ISR prefetch request, comprising a prefetch start signal and the ISR pointer, to an IFU of the prefetch PE.

In another aspect, a method for providing ISR prefetching is provided. The method comprises receiving, by an ISR prefetch control circuit from an interrupt controller of a multicore processor-based system, an IRQ identifier corresponding to an interrupt directed to a target PE of a plurality of PEs. The method further comprises fetching an ISR pointer for an ISR corresponding to the IRQ identifier. The method also comprises selecting a prefetch PE from the plurality of PEs to perform an ISR prefetch on behalf of the target PE. The method additionally comprises providing an ISR prefetch request, comprising a prefetch start signal and the ISR pointer, to an IFU of the prefetch PE.

DETAILED DESCRIPTION

Figure 1:
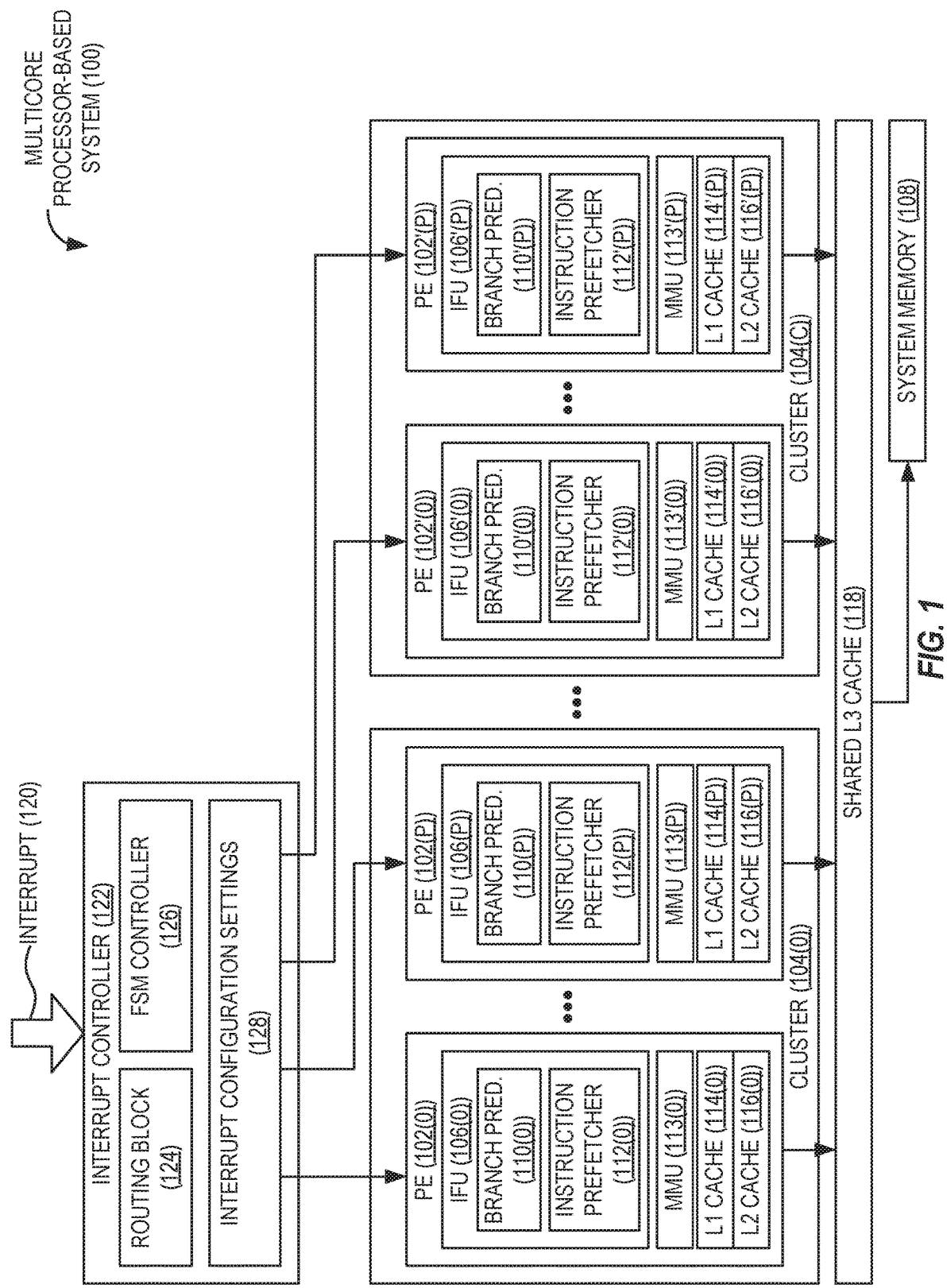
FIG. 1 is a block diagram of a multicore processor-based system as known in the art for processing interrupts.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing interrupt service routine (ISR) prefetching in multicore processor-based systems to improve interrupt handling performance Before describing methods and apparatus for performing ISR prefetching operations, the operations of a conventional multicore processor-based system for receiving and servicing interrupts are first discussed. In this regard, FIG. 1 provides a block diagram illustrating a multicore processor-based system 100. The multicore processor-based system 100 includes a plurality of processor elements (PEs) 102(0)-102(P), 102'(0)-102'(P), each of which may comprise a processor device or a processor core, as non-limiting examples. The PEs 102(0)-102(P), 102'(0)-102'(P) of FIG. 1 are organized into clusters 104(0)-104(C), with the PEs 102(0)-102(P) residing in the cluster 104(0) and the PEs 102'(0)-102'(P) residing in the cluster 104(C). It is to be understood that some aspects of the multicore processor-based system 100 may comprise more or fewer PEs than the PEs 102(0)-102(P), 102'(0)-102'(P) shown in FIG. 1, and may be organized into more or fewer clusters than the clusters 104(0)-104(C) shown in FIG. 1.

The PEs 102(0)-102(P), 102'(0)-102'(P) provide respective instruction fetch units (IFUs) 106(0)-106(P), 106'(0)-106'(P) for retrieving instructions and related data for execution from a system memory 108. The system memory 108 in some aspects may comprise a double-data-rate (DDR) memory, as a non-limiting example. The IFUs 106(0)-106(P), 106'(0)-106'(P) of FIG. 1 include corresponding branch predictors 110(0)-110(P), 110'(0)-110'(P) for predicting the outcome of conditional instructions to be executed by the PEs 102(0)-102(P), 102'(0)-102'(P), as well as corresponding instruction prefetchers 112(0)-112(P), 112'(0)-112'(P) for performing the actual retrieval operations to obtain instructions and data for execution. The PEs 102(0)-102(P), 102'(0)-102'(P) also include respective memory management units (MMUs) 113(0)-113(P), 113'(0)-113'(P), as well as respective Level 1 ("L1") caches 114(0)-114(P), 114'(0)-114'(P) and Level 2 ("L2") caches 116(0)-116(P), 116'(0)-116'(P) for storing copies of frequently used data. The L1 caches 114(0)-114(P), 114'(0)-114'(P) may include, for example, L1 instruction caches and/or L1 data caches. Each of the PEs 102(0)-102(P), 102'(0)-102'(P) is also coupled to a shared Level 3 ("L3") cache 118, which may also be referred to herein generally as a "shared system cache."

To manage handling and servicing of interrupts such as an interrupt 120, the multicore processor-based system 100 provides an interrupt controller 122. The interrupt controller 122 provides a routing block 124, which includes circuitry and logic for identifying an interrupt input (e.g., a target PE of the PEs 102(0)-102(P), 102'(0)-102'(P) to which the interrupt 120 is directed), and routing data associated with the interrupt 120 to the interrupt input for interrupt handling. The interrupt controller 122 also provides a finite state machine (FSM) controller 126, which is used to track whether the interrupt 120 is in an inactive mode (i.e., the interrupt 120 has not been asserted), a pending mode (i.e., the interrupt 120 has been asserted but the target PE 102(0)-102(P), 102'(0)-102'(P) has not loaded an ISR), an active and pending mode (i.e., the target PE 102(0)-102(P), 102'(0)-102'(P) is busy executing another ISR), or an active mode (i.e., the interrupt 120 is presently being serviced by the target PE 102(0)-102(P), 102'(0)-102'(P)). The interrupt controller 122 further includes interrupt configuration settings 128 that enable parameters governing interrupt handling to be modified.

When the interrupt 120 is raised during exemplary operation of the multicore processor-based system 100 of FIG. 1, a target PE, such as the PE 102'(P), must prepare to execute an ISR corresponding to the interrupt 120. In a worst case scenario, the target PE 102'(P) may have to perform MMU table walk operations on the MMU 113'(P) to access the L1 cache 114'(P), the L2 cache 116'(P), the shared L3 cache 118, and eventually the system memory 108 to fetch a virtual address (VA) to physical address (PA) translation table in order to retrieve the instructions constituting the ISR to be executed. Consequently, in the worst case, the interrupt latency associated with handling the interrupt 120 may include the time required to access each of the MMU 113'(P), the L1 cache 114'(P), the L2 cache 116'(P), the shared L3 cache 118, and the system memory 108, as well as the time required to fetch the instructions from the system memory 108, load MMU page table information into a translation lookaside buffer (TLB), and then load the ISR instructions into the L1 cache 114'(P), the L2 cache 116'(P), and/or the shared L3 cache 118.

The interrupt controller 122 according to some aspects may mitigate interrupt latency by providing support for nestable interrupts, which allow the target PE 102'(P) to intervene during the servicing of a lower priority interrupt to allow a higher priority interrupt to be handled. However, as noted above, nestable interrupts may not result in increased processor performance if the handling of the lower priority interrupt must complete before the target PE 102'(P) can resume normal tasks. Interrupt latency may be further increased due to the fact that, when the target PE 102'(P) first becomes aware of the interrupt 120, the corresponding IFU 106'(P) does not become aware of the appropriate ISR to fetch until the target PE 102'(P) executes a corresponding top-level handler to identify the ISR based on an interrupt request (IRQ) identifier received from the interrupt controller 122. Accordingly, it is desirable to provide a mechanism for improving system performance by decreasing the latency incurred with fetching the ISR.

Figure 2:
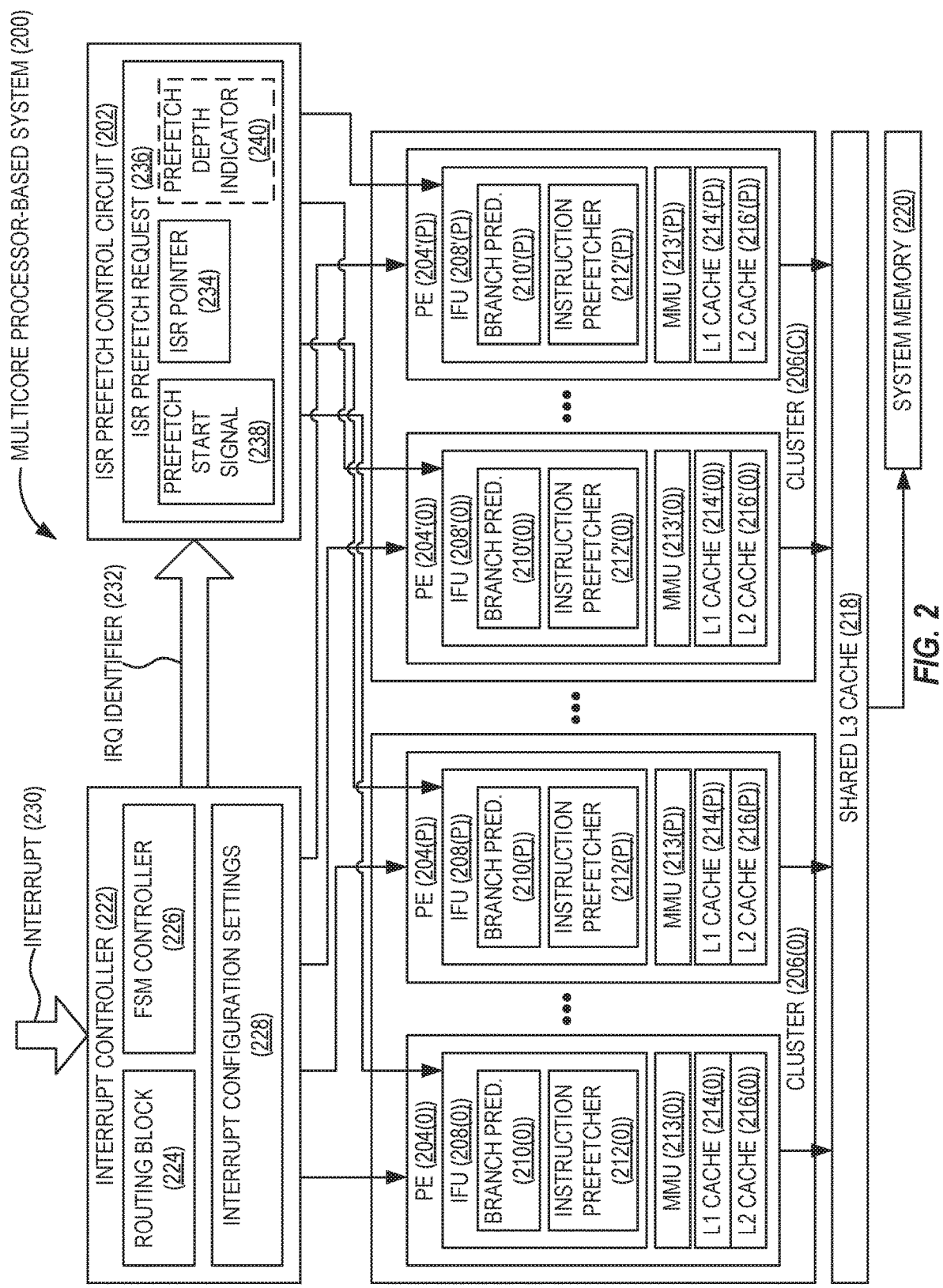
FIG. 2 is a block diagram of a multicore processor-based system including an interrupt service routine (ISR) prefetch control circuit for providing ISR prefetching.

In this regard, FIG. 2 illustrates a multicore processor-based system 200 that provides an ISR prefetch control circuit 202 for performing ISR prefetching operations to reduce interrupt service latency. As seen in FIG. 2, the multicore processor-based system 200 includes PEs 204(0)-204(P), 204'(0)-204'(P) organized into clusters 206(0)-206(C). The PEs 204(0)-204(P), 204'(0)-204'(P) and the clusters 206(0)-206(C) of FIG. 2 correspond in functionality to the PEs 102(0)-102(P), 102'(0)-102'(P) and the clusters 104(0)-104(C), respectively, of FIG. 1. Similarly, the PEs 204(0)-204(P), 204'(0)-204'(P) of FIG. 2 provide IFUs 208(0)-208(P), 208'(0)-208'(P), branch predictors 210(0)-210(P), 210'(0)-210'(P), instruction prefetchers 212(0)-212(P), 212'(0)-212'(P), MMUs 213(0)-213(P), 213'(0)-213'(P), L1 caches 214(0)-214(P), 214'(0)-214'(P), and L2 caches 216(0)-216(P), 216'(0)-216'(P) that correspond to the IFUs 106(0)-106(P), 106'(0)-106'(P), the branch predictors 110(0)-110(P), 110'(0)-110'(P), the instruction prefetchers 112(0)-112(P), 112'(0)-112'(P), the L1 caches 114(0)-114(P), 114'(0)-114'(P), and the L2 caches 116(0)-116(P), 116'(0)-116'(P), respectively, of FIG. 1. The multicore processor-based system 200 of FIG. 2 also includes a shared L3 cache 218 communicatively coupled to a system memory 220, as well as an interrupt controller 222 comprising a routing block 224, an FSM controller 226, and interrupt configuration settings 228. The shared L3 cache 218 may also be referred to herein generally as a "shared system cache."

It is to be understood that the multicore processor-based system 200 of FIG. 2 may include more or fewer elements than illustrated in FIG. 2. The multicore processor-based system 100 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

During exemplary operation of the multicore processor-based system 200, the interrupt controller 222 may receive an interrupt 230 directed to a target PE, such as the PE 204'(P) of the PEs 204(0)-204(P), 204'(0)-204'(P). As used herein, the "target PE 204'(P)" refers to the PE 204'(P) responsible for executing an ISR to provide interrupt handling for the interrupt 230. It is to be understood that any of the PEs 204(0)-204(P), 204'(0)-204'(P) may be indicated as a target PE, and that the target PE 204'(P) is designated as such only as a non-limiting example. When the interrupt 230 is received by the interrupt controller 222 of FIG. 2, the interrupt controller 222 in some aspects is configured to determine an IRQ identifier 232 corresponding to the interrupt 230, and provide the IRQ identifier 232 to the ISR prefetch control circuit 202. The interrupt controller 222 according to some aspects may be configured to provide additional information not shown in FIG. 2 to the ISR prefetch control circuit 202 to facilitate ISR prefetching. As non-limiting examples, the interrupt controller 222 may also provide a validity indicator to indicate a validity status of the interrupt 230 to the ISR prefetch control circuit 202. In some aspects, the interrupt configuration settings 228 of the interrupt controller 222 may comprise one or more configuration bits allowing ISR prefetching to be selectively enabled or disabled for individual interrupt lines.

Upon receiving the IRQ identifier 232 from the interrupt controller 222, the ISR prefetch control circuit 202 fetches an ISR pointer 234 to an ISR corresponding to the IRQ identifier 232. The ISR pointer 234, in some aspects, represents a VA of a starting instruction of the ISR corresponding to the IRQ identifier 232, and may be stored in a lookup table (LUT) maintained in the system memory 220. The ISR prefetch control circuit 202 then selects a prefetch PE, such as the PE 204(P), of the PEs 204(0)-204(P), 204'(0)-204'(P). The "prefetch PE 204(P)," as used herein, refers to the PE 204(P) responsible for prefetching the ISR for servicing the interrupt 230, and storing the ISR in a shared system cache (e.g., the shared L3 cache 218) for later retrieval and execution by the target PE 204'(P). It is to be understood that any of the PEs 204(0)-204(P), 204'(0)-204'(P) may be selected as the prefetch PE by the ISR prefetch control circuit 202, and that the prefetch PE 204(P) is designated as such only as a non-limiting example. As discussed in greater detail below with respect to FIG. 3, the ISR prefetch control circuit 202 in some aspects may select the prefetch PE 204(P) by analyzing performance monitor unit (PMU) counters for the PEs 204(0)-204(P), 204'(0)-204'(P) at different times to determine the relative prefetch performance of each of the PEs 204(0)-204(P), 204'(0)-204'(P) over the monitored time (e.g., a number of instructions prefetched per processor cycle by the instruction prefetchers 212(0)-212(P), 212'(0)-212'(P)). The ISR prefetch control circuit 202 may then select the prefetch PE 204(P) having a less intense prefetch load than other PEs of the PEs 204(0)-204(P), 204'(0)-204'(P) to prefetch the ISR.

After selecting the prefetch PE 204(P), the ISR prefetch control circuit 202 assembles an ISR prefetch request 236 to provide to the prefetch PE 204(P). The ISR prefetch request 236 includes the ISR pointer 234 as well as a prefetch start signal 238 that instructs the prefetch PE 204(P) to initiate a prefetch operation. In some aspects, the ISR prefetch request 236 may also include a prefetch depth indicator 240, which indicates how many instructions should be prefetched by the prefetch PE 204(P). The ISR prefetch control circuit 202 then provides the ISR prefetch request 236 to the selected prefetch PE 204(P). Upon receiving the ISR prefetch request 236 from the ISR prefetch control circuit 202, some aspects of the IFU 208(P) of the prefetch PE 204(P) prefetches the ISR (e.g., from the system memory 220) based on the ISR pointer 234, and stores the ISR in a shared cache (such as the shared L3 cache 218) to be accessed by the target PE 204'(P).

According to some aspects, as part of prefetching the ISR, an MMU page table walk may be performed by the prefetch PE 204(P), with the resulting MMU page table data also saved into the shared cache. In aspects in which an MMU TLB is shared between the target PE 204'(P) and the prefetch PE 204(P), the prefetch PE 204(P) may store the MMU page table data in the shared MMU TLB, which enables the target PE 204'(P) to avoid the overhead incurred in performing an MMU page table walk when the target PE 204(0) services the interrupt 230. In other aspects in which an MMU TLB is not shared between the target PE 204'(P) and the prefetch PE 204(P), the MMU page table data may be stored in the shared cache along with the ISR for later retrieval by the target PE 204'(P).

In this manner, the ISR can be prefetched by the prefetch PE 204(P) while the target PE 204'(P) that is assigned to service the interrupt 230 and execute the ISR can perform other operations to execute the ISR and then retrieve the ISR directly from the shared L3 cache 218. As a result, the interrupt latency involved with fetching the ISR from the system memory 220 (in a worst-case scenario) is reduced or eliminated from the overall interrupt service handling time.

Figure 3:
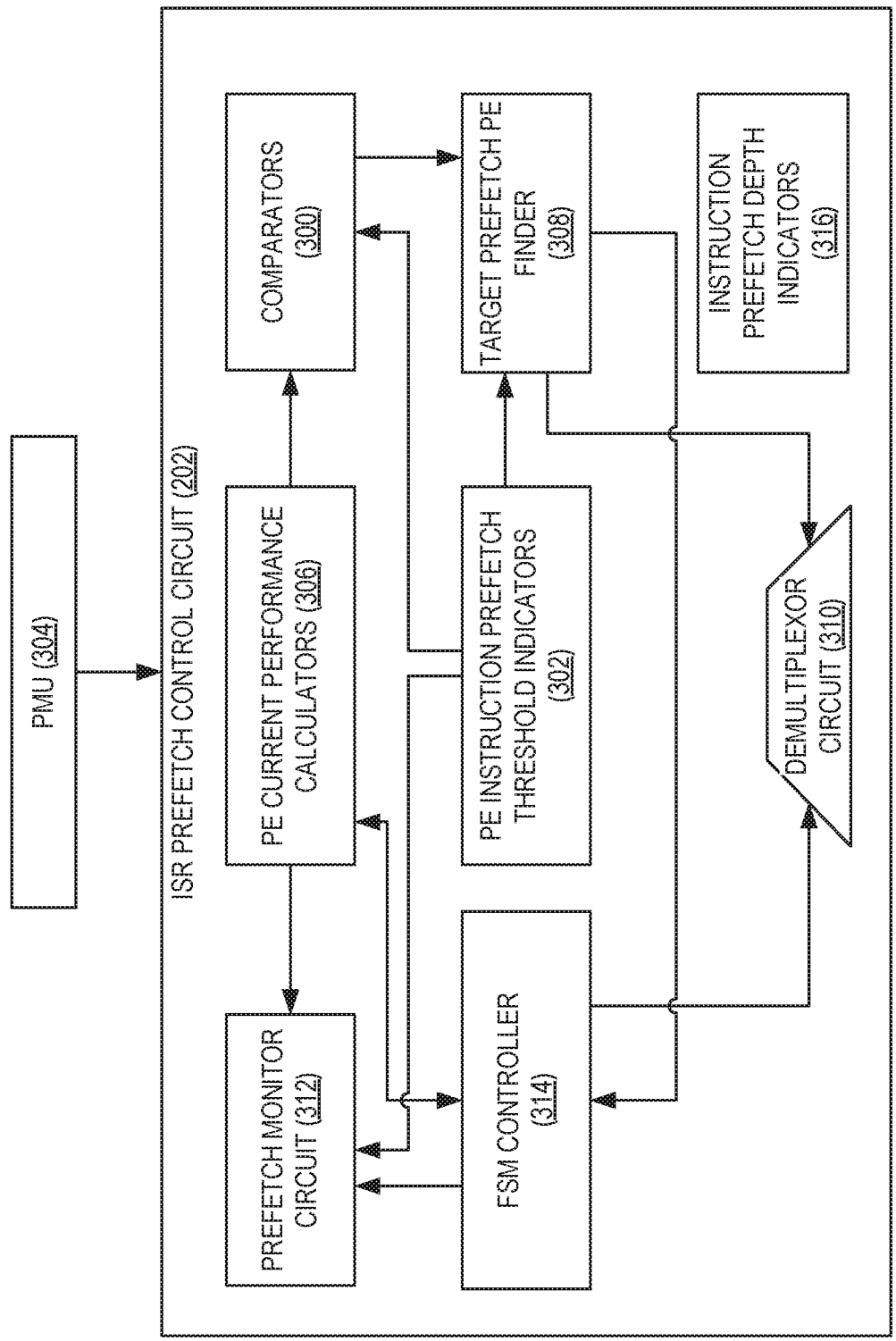
FIG. 3 is a block diagram illustrating a more detailed view of exemplary elements of the ISR prefetch control circuit of FIG. 2 according to some aspects.

FIG. 3 is a block diagram illustrating a more detailed view of the ISR prefetch control circuit 202 of FIG. 2 according to some aspects. As seen in FIG. 3, the ISR prefetch control circuit 202 provides a plurality of comparators 300 that correspond to the PEs 204(0)-204(P), 204'(0)-204'(P) of FIG. 2, and that are configured to determine whether each of the PEs 204(0)-204(P), 204'(0)-204'(P) has a sufficient performance margin at a given time to qualify for selection as a prefetch PE. To make this determination, the comparators 300 are configured to compare a prefetch performance level of each PE 204(0)-204(P), 204'(0)-204'(P) with respective PE instruction prefetch threshold indicators 302. The prefetch performance levels of the PEs 204(0)-204(P), 204'(0)-204'(P), in some aspects, are indicated by a plurality of PE PMU counters (not shown) of a PMU 304 associated with the plurality of PEs 204(0)-204(P), 204'(0)-204'(P), and are calculated by a corresponding plurality of PE current performance calculators 306. The PE instruction prefetch threshold indicators 302, in some aspects, may be implemented by the PEs 204(0)-204(P), 204'(0)-204'(P) as part of a shared block, and may be software-programmable based on application load, thread load, and/or priority handled by the respective PEs 204(0)-204(P), 204'(0)-204'(P). The output of the comparators 300 is provided to a target prefetch PE finder 308 (e.g., via AND gates for the plurality of PEs 204(0)-204(P), 204'(0)-204'(P) to gate the output with whichever of the PEs 204(0)-204(P), 204'(0)-204'(P) is active, for aspects in which only active PEs 204(0)-204(P), 204'(0)-204'(P) are considered to avoid prefetching at the cost of increased power consumption).

Based on the output from the comparators 300, the target prefetch PE finder 308 selects a target PE from among the plurality of PEs 204(0)-204(P), 204'(0)-204'(P), and controls a demultiplexor circuit 310 for issuing the ISR prefetch request 236 of FIG. 2 to the designated target PE to perform the ISR prefetching. According to some aspects, the ISR prefetch control circuit 202 may be configured to not perform an ISR prefetch if the prefetch performance levels of the PEs 204(0)-204(P), 204'(0)-204'(P) are all determined to be higher than the corresponding PE instruction prefetch threshold indicators 302. The target prefetch PE finder 308 in some aspects may also be configured to not select any of the PEs 204(0)-204(P), 204'(0)-204'(P) currently in a low-power state as the prefetch PE. Instead, the target prefetch PE finder 308 may select one of the PEs 204(0)-204(P), 204'(0)-204'(P) having the lowest prefetch performance level that is lower than a corresponding PE instruction prefetch threshold indicator 302 as the prefetch PE.

The ISR prefetch control circuit 202 of FIG. 3 also provides a prefetch monitor circuit 312. The prefetch monitor circuit 312 is configured to provide a closed feedback mechanism to detect whether a prefetch PE of the PEs 204(0)-204(P), 204'(0)-204'(P) currently performing a prefetch operation unexpectedly becomes busy with a different task, requiring the prefetch operation to be reassigned to another of the PEs 204(0)-204(P), 204'(0)-204'(P). The prefetch monitor circuit 312 thus may be communicatively coupled to the IFUs 208(0)-208(P), 208'(0)-208'(P) of FIG. 2, and may be configured to receive signals from the IFUs 208(0)-208(P), 208'(0)-208'(P) indicating whether a prefetch operation has completed, and/or send signals to the IFUs 208(0)-208(P), 208'(0)-208'(P) to force a pending ISR prefetch to be stopped and/or restarted.

Some aspects of the ISR prefetch control circuit 202 of FIG. 3 further include an FSM controller 314 that is configured to receive the IRQ identifier 232 from the interrupt controller 222 of FIG. 2. The FSM controller 314 may then perform operations for fetching the ISR pointer 234 corresponding to the IRQ identifier 232. Operations of the FSM controller 314 for receiving the IRQ identifier 232 and processing ISR prefetch requests 236 are discussed in greater detail below with respect to FIG. 4. Additionally, the ISR prefetch control circuit 202 according to some aspects also provides instruction prefetch depth indicators 316 corresponding to the PEs 204(0)-204(P), 204'(0)-204'(P). Like the PE instruction prefetch threshold indicators 302, in some aspects, the instruction prefetch depth indicators 316 may be implemented by the PEs 204(0)-204(P), 204'(0)-204'(P) as part of a shared block. In some aspects, the instruction prefetch depth indicators 316 may include instruction prefetch depth indicators for indicating how many instructions should be prefetched for ISRs, and/or may include instruction prefetch depth indicators for indicating how many instructions should be prefetched for top-level handlers.

Figure 4:
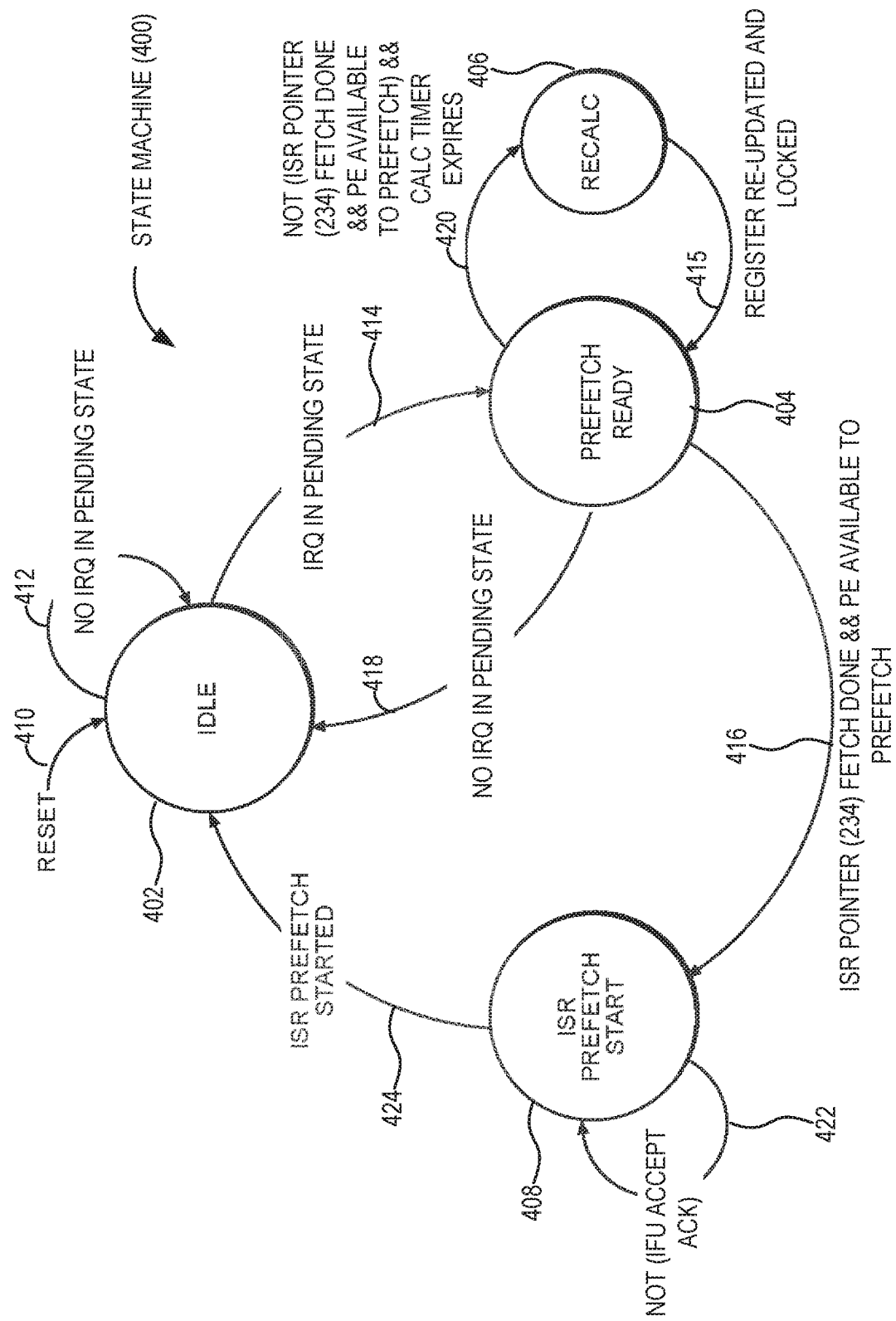
FIG. 4 is a block diagram illustrating an exemplary state machine that may be implemented by a finite state machine (FSM) controller of the ISR prefetch control circuit of FIG. 3 for receiving interrupts and processing ISR prefetch requests according to some aspects.

FIG. 4 illustrates an exemplary state machine 400 that may be implemented by the FSM controller 314 of FIG. 3 in some aspects. In the example of FIG. 4, the state machine 400 includes four (4) states: an IDLE state 402, a PREFETCH READY state 404, a RECALC state 406, and an ISR PREFETCH START state 408. Each of the states 402, 404, 406, 408, and the transitions between states 402, 404, 406, 408, is discussed in turn below.

The state machine 400 enters the IDLE state 402 upon reset, as indicated by arrow 410, and also remains in the IDLE state 402 as long as there is no IRQ pending, as indicated by arrow 412. When an IRQ for which prefetch is enabled goes into a pending state, the state machine 400 transitions into the PREFETCH READY state 404, as indicated by arrow 414. During this transition, the FSM controller 314 fetches the ISR pointer 234 for the ISR to be prefetched. The FSM controller 314 may also lock a register storing a prefetch performance level (e.g., an instruction per cycle value received from the PMU 304 of FIG. 3)

In the PREFETCH READY state 404, the state machine 400 waits until a prefetch PE of the plurality of PEs 204(0)-204(P), 204'(0)-204'(P) of FIG. 2 is determined to be available to perform an ISR prefetch operation, and a fetch of an ISR pointer 234 is complete with the IRQ in the pending state. At this point, the state machine 400 transitions to the ISR PREFETCH START state 408, as indicated by arrow 416. If, during the process of selecting a prefetch PE, the pending IRQ moves into an active state, the state machine 400 transitions back to the IDLE state 402, as indicated by arrow 418.

The RECALC state 406 is entered into only if a window defined by an instruction prefetch bandwidth calculation timer ("CALC TIMER") expires before a prefetch PE is determined to be available and the fetch of the ISR pointer 234 is complete, as indicated by arrow 420. This allows the register tracking the prefetch performance level to be updated and locked (as indicated by arrow 420), which enables the selection of a target register to be revisited if necessary based on changing performance conditions of the PEs 204(0)-204(P), 204'(0)-204'(P). Once the register tracking the prefetch performance level is updated and locked, the state machine 400 returns to the PREFETCH READY state 404, as indicated by arrow 415.

Finally, the state machine 400 enters the ISR PREFETCH START state 408 from the PREFETCH READY state 404 when a prefetch PE is determined to be available and the fetch of the ISR pointer 234 is complete, as indicated by arrow 416. In the ISR PREFETCH START state 408, the FSM controller 314 delivers the ISR pointer 234 to the target PE. While awaiting an acknowledgment from the IFU of the target PE, the state machine 400 remains in the ISR PREFETCH START state 408, as indicated by arrow 422. Upon receiving an acknowledgment from the IFU of the target PE, the prefetch of the ISR by the target PE starts, as indicated by arrow 424. The state machine 400 then transitions back to the IDLE state 402.

Figure 5:
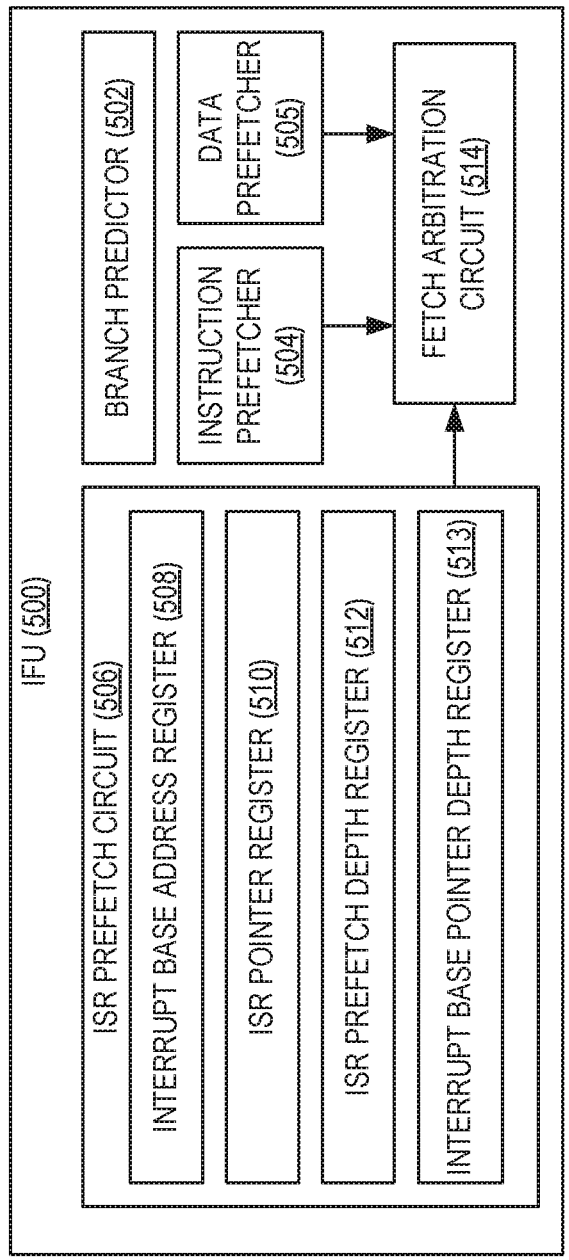
FIG. 5 is a block diagram illustrating a more detailed view of exemplary elements of an instruction fetch unit (IFU) of a processor element (PE) of FIG. 2 for performing an ISR prefetch operation.

To illustrate a more detailed view of an IFU of the plurality of IFUs 208(0)-208(P), 208'(0)-208'(P) of FIG. 2 for performing an ISR prefetch operation, FIG. 5 is provided. As seen in FIG. 5, an exemplary IFU 500, corresponding in functionality to the IFUs 208(0)-208(P), 208'(0)-208'(P) of FIG. 2 in some aspects, provides a branch predictor 502 and an instruction prefetcher 504 (corresponding to the branch predictors 210(0)-210(P), 210'(0)-210'(P) and the instruction prefetchers 212(0)-212(P), 212'(0)-212'(P) of FIG. 2), as well as a data prefetcher 505. Additionally, in the example of FIG. 5, the IFU 500 includes an ISR prefetch circuit 506 configured to receive the ISR pointer 234 and, in response to the prefetch start signal 238, perform an ISR prefetch operation. In some aspects, the ISR prefetch circuit 506 is communicatively coupled to the prefetch monitor circuit 312 of FIG. 3 to enable the prefetch monitor circuit 312 to track the status of a prefetch operation being performed by the ISR prefetch circuit 506.

The ISR prefetch circuit 506 includes an interrupt base address register 508, an ISR pointer register 510, an ISR prefetch depth register 512, and an interrupt base pointer depth register 513, each of which stores data for use during prefetch operations. The interrupt base address register 508, which in some aspects may correspond to an interrupt base address register provided by conventional IFUs, stores an interrupt vector base address of an interrupt vector table (not shown) that associates IRQs with corresponding ISRs. The ISR pointer register 510 stores an ISR function pointer that serves as a base address for retrieving any ISR as part of a prefetch operation. For instance, in some aspects, an ISR function pointer for each ISR may be stored at sequential known addresses, with the ISR pointer register 510 representing the first ISR function pointer (e.g., for IRQ number zero (0)). Each subsequent ISR function pointer may be accessed using the value of the ISR pointer register 510 plus an offset calculated based on the size of the ISR function pointer and the IRQ identifier associated with the ISR (e.g., the ISR pointer register 510 plus the size of the ISR function pointer multiplied by the IRQ number indicated by the IRQ identifier). The ISR prefetch depth register 512 and the interrupt base pointer depth register 513 of the ISR prefetch circuit 506 each indicates a prefetch "depth," or number of instructions to fetch during the prefetch operation. In some aspects, the ISR prefetch circuit 506 is configured to perform an ISR prefetch operation by fetching from the address specified by the ISR pointer register 510 to the depth specified by the ISR prefetch depth register 512. Some aspects also provide that the ISR prefetch circuit 506 is configured to perform an ISR prefetch operation by fetching from the address specified by the interrupt base address register 508 to the depth specified by the interrupt base pointer depth register 513. The ISR prefetch depth register 512 and/or the interrupt base pointer depth register 513, according to some aspects, may be software-programmable.

Some aspects of the ISR prefetch circuit 506 of FIG. 5 also provide a fetch arbitration circuit 514, which is activated by the ISR prefetch circuit 506 only during an active window of ISR prefetch operations. The fetch arbitration circuit 514 arbitrates between the instruction prefetcher 504, the data prefetcher 505, and the ISR prefetch circuit 506 to balance the consumption of processor resources used by the IFU 500 for conventional instruction and data prefetching and ISR prefetching. In some aspects, the fetch arbitration circuit 514 is communicatively coupled to the prefetch monitor circuit 312 of FIG. 3, and is configured to send an "ISR prefetch complete" signal to the prefetch monitor circuit 312 upon completion of an ISR prefetch operation by the IFU 500. The fetch arbitration circuit 514 in some aspects may be integrated into an existing arbiter circuit configured to arbitrate between conventional instruction prefetchers (e.g., the instruction prefetcher 504) and data prefetchers (e.g., the data prefetcher 505). According to some aspects, a master port (not shown) of the ISR prefetch circuit 506 may be selectively enabled during an active window of ISR prefetch operations. Such selective enabling of the master port may reduce the burden on the fetch arbitration circuit 514 by allowing the fetch arbitration circuit 514 to avoid having to check the master port outside the active window of ISR prefetch operations. Additionally, some aspects may provide that a rate at which ISR prefetch requests (such as the ISR prefetch request 236 of FIG. 2) are received may be configurable, allowing bandwidth consumption to be balanced between conventional instruction and data prefetchers and the ISR prefetch circuit 506.

It is to be understood that, while the ISR prefetch circuit 506 is shown in FIG. 5 as being integrated into the IFU 500, the ISR prefetch circuit 506 in other aspects may be integrated into other elements of the multicore processor-based system 200 of FIG. 2, or may be provided as a separate, independent element within the multicore processor-based system 200. For example, the ISR prefetch circuit 506 may be provided as an integral element of a dedicated ISR prefetch component that is communicatively coupled to the ISR prefetch control circuit 202 of FIG. 2, and that may include a local MMU/MMU-TLB. In such aspects, the target prefetch PE finder 308 of FIG. 3 may be omitted, and the ISR prefetch control circuit 202 of FIG. 2 may be configured to communicate ISR prefetch data directly to the ISR prefetch circuit 506.

To illustrate exemplary operations for providing ISR prefetching in the multicore processor-based system 200 of FIG. 2, FIGS. 6A-6C are provided. For the sake of clarity, elements of FIGS. 2, 3, and 5 are referenced in describing FIGS. 6A-6C. Operations in FIG. 6A begin with the interrupt controller 222, according to some aspects, receiving the interrupt 230 directed to a target PE, such as the PE 204'(P), of the plurality of PEs 204(0)-204(P), 204'(0)-204'(P) (block 600). In such aspects, the interrupt controller 222 determines an IRQ identifier 232 corresponding to the interrupt 230 (block 602). The interrupt controller 222 then provides the IRQ identifier 232 to the ISR prefetch control circuit 202 (block 604).

The ISR prefetch control circuit 202 then receives, from the interrupt controller 222 of the multicore processor-based system 200, the IRQ identifier 232 corresponding to the interrupt 230 directed to the target PE 204'(P) of the plurality of PEs 204(0)-204(P), 204'(0)-204'(P) (block 606). In this regard, the ISR prefetch control circuit 202 may be referred to herein as "a means for receiving an IRQ identifier corresponding to an interrupt directed to a target PE of a plurality of PEs." The ISR prefetch control circuit 202 next fetches an ISR pointer 234 for an ISR corresponding to the IRQ identifier 232 (block 608). Accordingly, the ISR prefetch control circuit 202 may be referred to herein as "a means for fetching an ISR pointer for an ISR corresponding to the IRQ identifier." Processing then resumes at block 610 of FIG. 6B.

Figure 6A:
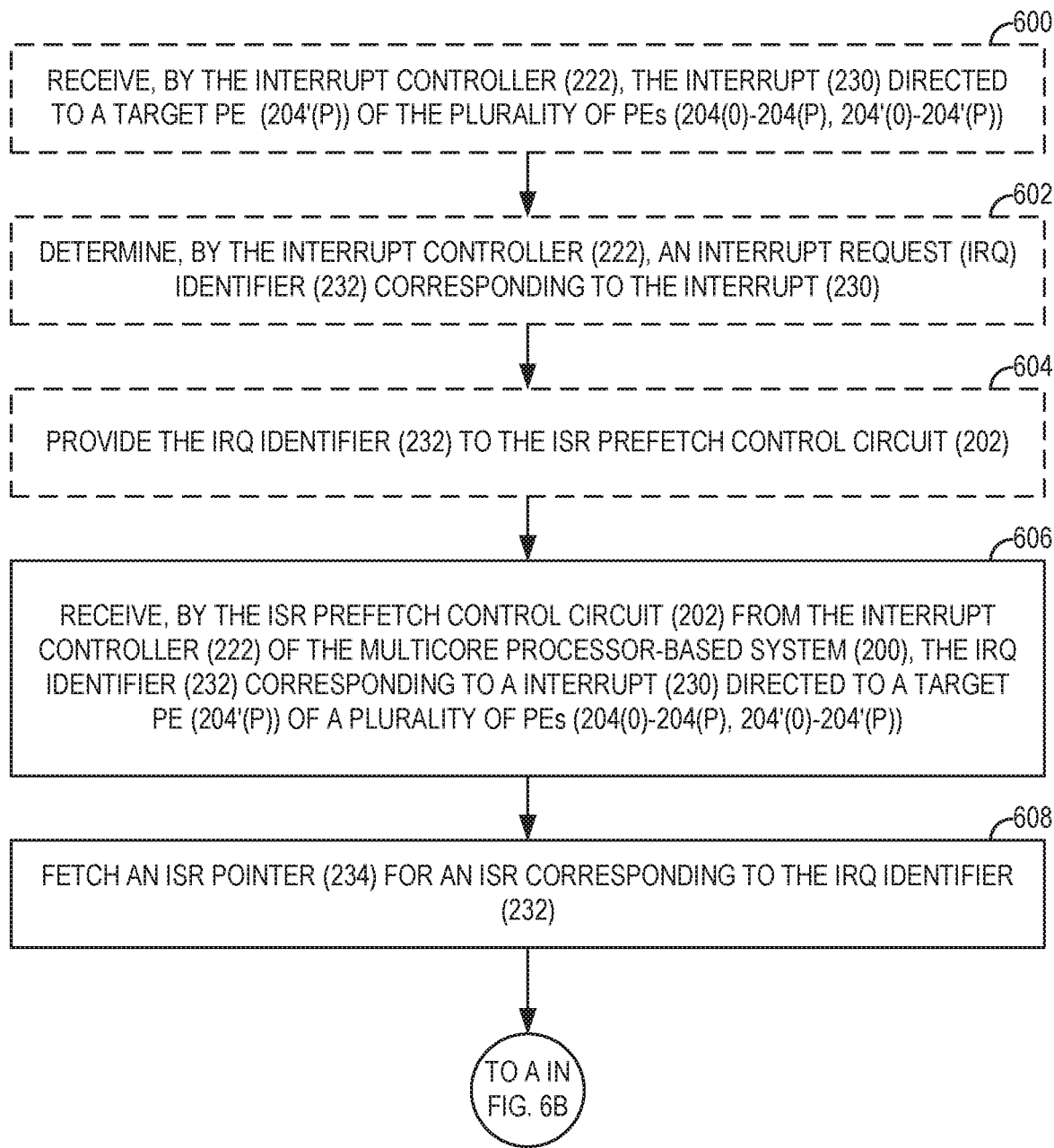
FIGS. 6A-6C are flowcharts illustrating an exemplary process for providing ISR prefetching in multicore processor-based systems.
Figure 6B:
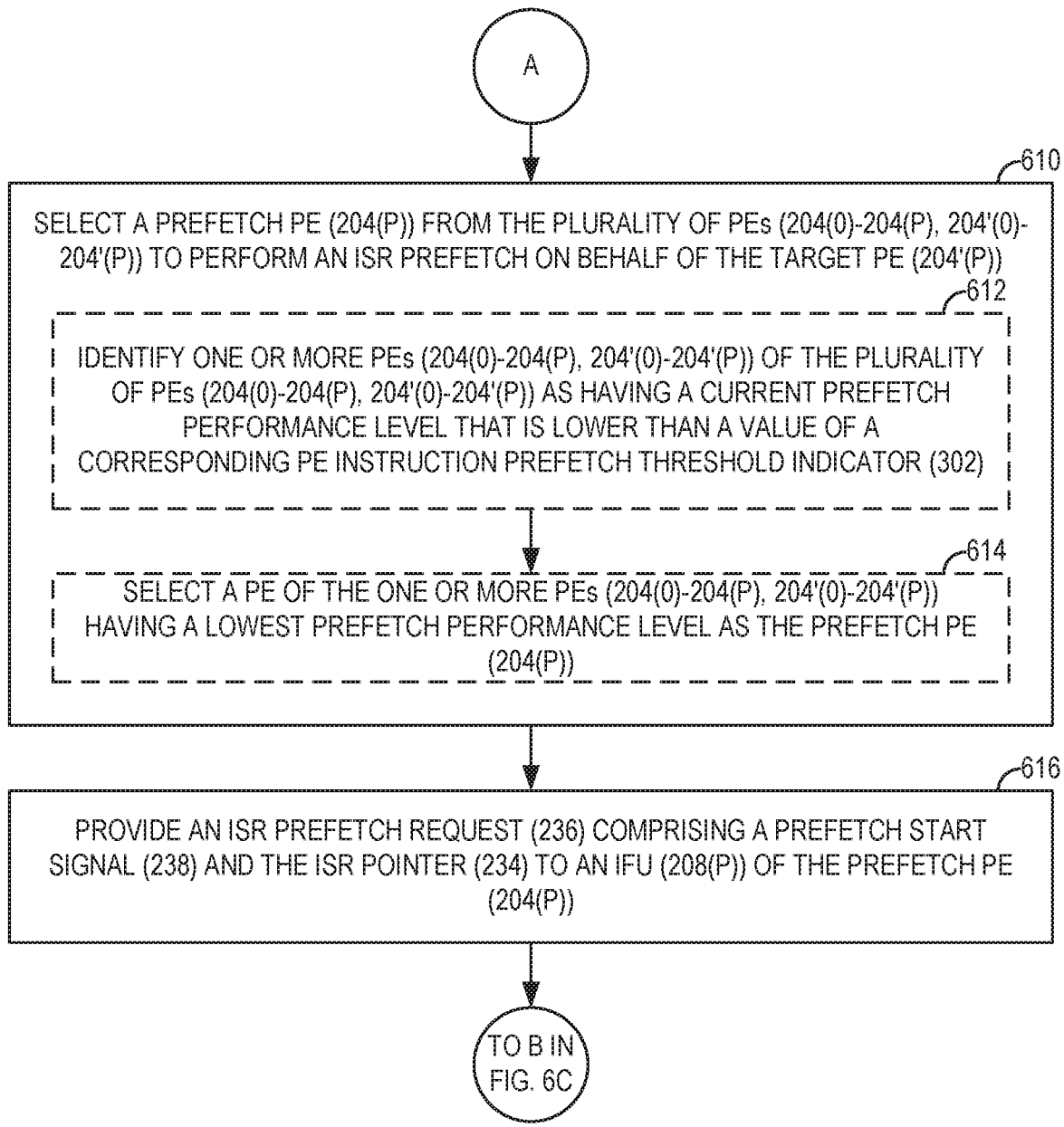

Referring now to FIG. 6B, the ISR prefetch control circuit 202 selects a prefetch PE, such as the PE 204(P), from the plurality of PEs 204(0)-204(P), 204'(0)-204'(P) to perform an ISR prefetch on behalf of the target PE 204'(P) (block 610). The ISR prefetch control circuit 202 thus may be referred to herein as "a means for selecting a prefetch PE from the plurality of PEs to perform an ISR prefetch on behalf of the target PE." In some aspects, the operations of block 610 for selecting the prefetch PE 204(P) may include first identifying one or more PEs 204(0)-204(P), 204'(0)-204'(P) of the plurality of PEs 204(0)-204(P), 204'(0)-204'(P) as having a current prefetch performance level that is lower than a value of a corresponding PE instruction prefetch threshold indicator 302 (block 612). The ISR prefetch control circuit 202 may then select a PE of the one or more PEs 204(0)-204(P), 204'(0)-204'(P) having a lowest prefetch performance level as the prefetch PE 204(P) (block 614). After selecting the prefetch PE 204(P), the ISR prefetch control circuit 202 provides the ISR prefetch request 236 comprising the prefetch start signal 238 and the ISR pointer 234 to the IFU 208(P) of the prefetch PE 204(P) (block 616). In this regard, the ISR prefetch control circuit 202 may be referred to herein as "a means for providing an ISR prefetch request, comprising a prefetch start signal and the ISR pointer, to an IFU of the prefetch PE." Processing then resumes at block 618 of FIG. 6C.

Figure 6C:
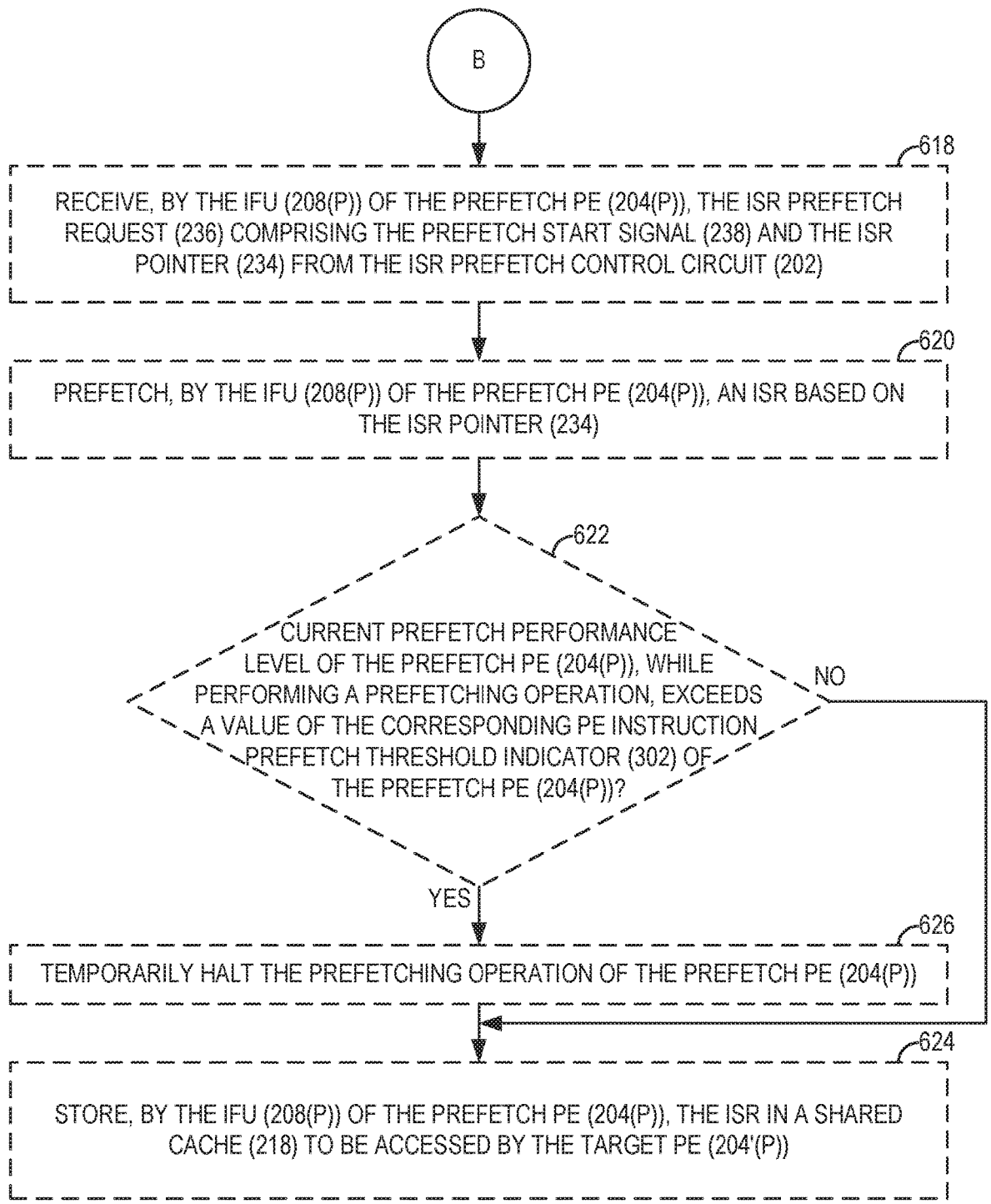

With reference to FIG. 6C, in some aspects, the IFU 208(P) of the prefetch PE 204(P) receives the ISR prefetch request 236 comprising the prefetch start signal 238 and the ISR pointer 234 from the ISR prefetch control circuit 202 (block 618). The IFU 208(P) then prefetches the ISR based on the ISR pointer 234 (block 620). Prefetching the ISR may comprise prefetching the ISR from the system memory 220, as a non-limiting example. Some aspects may provide that the prefetch monitor circuit 312 may determine whether a current prefetch performance level of the prefetch PE 204(P) while performing a prefetching operation, exceeds a value of the corresponding PE instruction prefetch threshold indicator 302 of the prefetch PE 204(P) (block 622). If so, the prefetch monitor circuit 312 may temporarily halt the prefetching operation of the prefetch PE 204(P) (block 626). After resuming the prefetching operation, or if the prefetch monitor circuit 312 determines at decision block 622 that the current prefetch performance level does not exceed the corresponding PE instruction prefetch threshold indicator 302, the IFU 208(P) stores the ISR in a shared cache, such as the shared L3 cache 218, to be accessed by the target PE 204'(P) (block 624).

Providing ISR prefetching in multicore processor-based systems according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
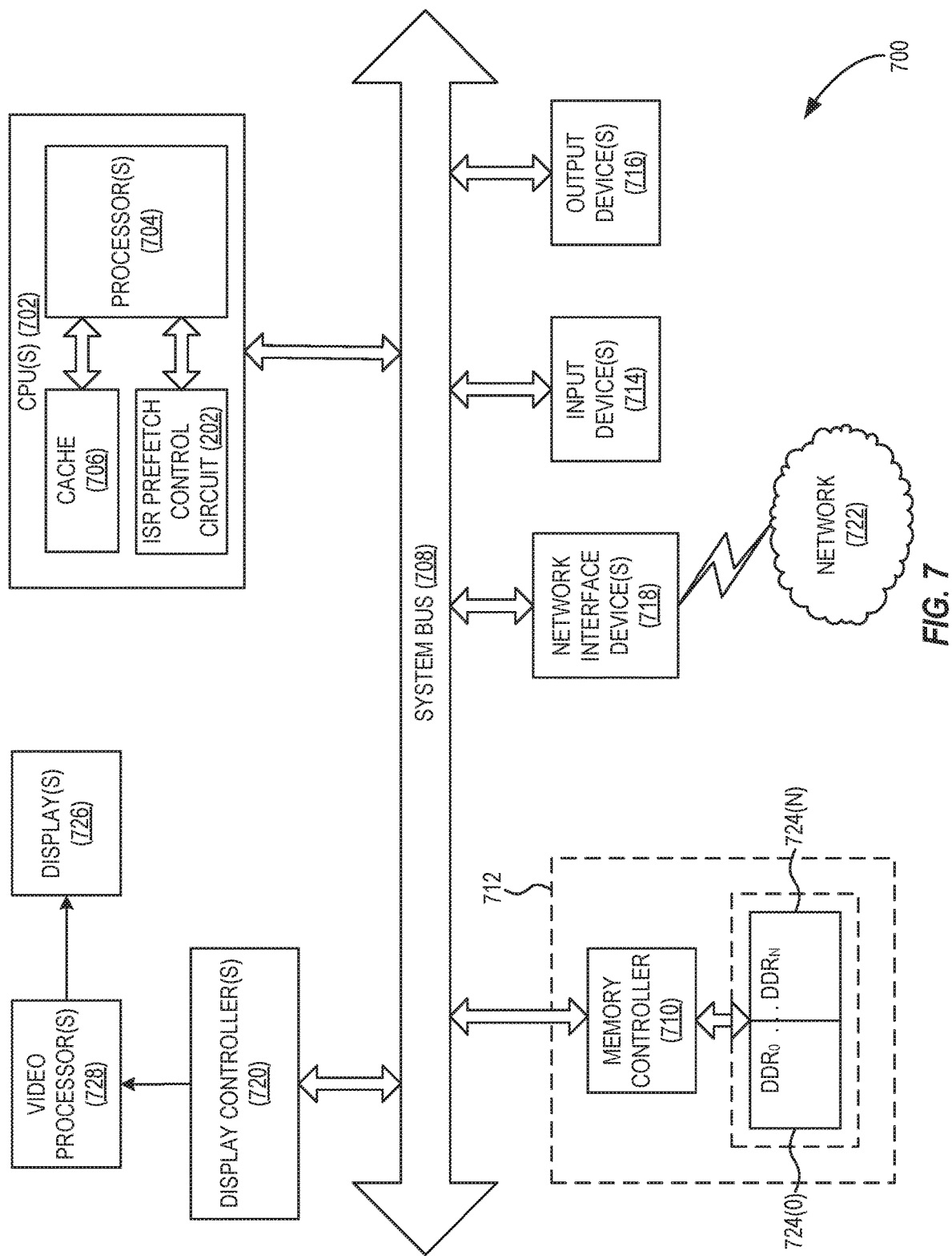
FIG. 7 is a block diagram of an exemplary processor-based system that can include PEs and the ISR prefetch control circuit of FIG. 2.

In this regard, FIG. 7 illustrates an example of a processor-based system 700 that can include the PEs 204(0)-204(P), 204'(0)-204'(P) and the ISR prefetch control circuit 202 of FIG. 2. The processor-based system 700 includes one or more central processing units (CPUs) 702, each including one or more processors 704 (which in some aspects may correspond to the PEs 204(0)-204(P), 204'(0)-204'(P) of FIG. 2) and the ISR prefetch control circuit 202 of FIG. 2. The CPU(s) 702 may have cache memory 706 coupled to the processor(s) 704 for rapid access to temporarily stored data. The CPU(s) 702 is coupled to a system bus 708 and can intercouple master and slave devices included in the processor-based system 700. As is well known, the CPU(s) 702 communicates with these other devices by exchanging address, control, and data information over the system bus 708. For example, the CPU(s) 702 can communicate bus transaction requests to a memory controller 710 as an example of a slave device.

Other master and slave devices can be connected to the system bus 708. As illustrated in FIG. 7, these devices can include a memory system 712, one or more input devices 714, one or more output devices 716, one or more network interface devices 718, and one or more display controllers 720, as examples. The input device(s) 714 can include any type of input device, including but not limited to input keys, switches, voice processors, etc. The output device(s) 716 can include any type of output device, including, but not limited to, audio, video, other visual indicators, etc. The network interface device(s) 718 can be any devices configured to allow exchange of data to and from a network 722. The network 722 can be any type of network, including, but not limited to, a wired or wireless network, a private or public network, a local area network (LAN), a wireless local area network (WLAN), a wide area network (WAN), a BLU- ETOOTH™ network, and the Internet. The network interface device(s) 718 can be configured to support any type of communications protocol desired. The memory system 712 can include one or more memory units 724(0)-724(N).

The CPU(s) 702 may also be configured to access the display controller(s) 720 over the system bus 708 to control information sent to one or more displays 726. The display controller(s) 720 sends information to the display(s) 726 to be displayed via one or more video processors 728, which process the information to be displayed into a format suitable for the display(s) 726. The display(s) 726 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A multicore processor-based system for providing interrupt service routine (ISR) prefetching, comprising:
    an interrupt controller;
    a plurality of processor elements (PEs) comprising a corresponding plurality of instruction fetch units (IFUs); and
    an ISR prefetch control circuit communicatively coupled to the interrupt controller and to the plurality of IFUs;
    the ISR prefetch control circuit configured to:
        receive, from the interrupt controller, an interrupt request (IRQ) identifier corresponding to an interrupt directed to a target PE of the plurality of PEs;
        fetch an ISR pointer for an ISR corresponding to the IRQ identifier;
        select a prefetch PE from the plurality of PEs to perform an ISR prefetch on behalf of the target PE; and
        provide an ISR prefetch request, comprising a prefetch start signal and the ISR pointer to an IFU of the prefetch PE.

2. The multicore processor-based system of claim 1, wherein:
    the plurality of PEs comprises a corresponding plurality of PE instruction prefetch threshold indicators; and
    the ISR prefetch control circuit is configured to select the prefetch PE by being configured to:
        identify one or more PEs of the plurality of PEs having a current prefetch performance level that is lower than a value of a corresponding PE instruction prefetch threshold indicator; and
        select a PE of the one or more PEs having a lowest prefetch performance level as the prefetch PE.

3. The multicore processor-based system of claim 2, wherein the ISR prefetch control circuit is configured to identify the one or more PEs based on data provided by a performance monitoring unit (PMU) of the multicore processor-based system.

4. The multicore processor-based system of claim 2, wherein the ISR prefetch control circuit further comprises a prefetch monitor circuit configured to:
   determine, during a prefetching operation by the prefetch PE, whether the current prefetch performance level of the prefetch PE exceeds a value of the corresponding PE instruction prefetch threshold indicator of the prefetch PE; and
   responsive to determining that the current prefetch performance level of the prefetch PE exceeds a value of the corresponding PE instruction prefetch threshold indicator of the prefetch PE, temporarily halt the prefetching operation of the prefetch PE.

5. The multicore processor-based system of claim 2, wherein the plurality of PE instruction prefetch threshold indicators is configured to be software-programmable.

6. The multicore processor-based system of claim 1, wherein the interrupt controller is configured to:
   receive the interrupt directed to the target PE of the plurality of PEs;
   determine the IRQ identifier corresponding to the interrupt; and
   provide the IRQ identifier to the ISR prefetch control circuit.

7. The multicore processor-based system of claim 1, further comprising a shared cache;
   wherein the IFU of the prefetch PE is configured to:
      receive, from the ISR prefetch control circuit, the ISR prefetch request comprising the prefetch start signal and the ISR pointer;
      prefetch the ISR based on the ISR pointer; and
      store the ISR in the shared cache to be accessed by the target PE.

8. The multicore processor-based system of claim 7, further comprising an ISR prefetch circuit configured to prefetch the ISR.

9. The multicore processor-based system of claim 8, wherein:
   the ISR prefetch circuit is integrated into the IFU of the prefetch PE; and
   the IFU of the prefetch PE comprises a fetch arbitration circuit configured to arbitrate between the ISR prefetch circuit and an instruction prefetch circuit of the IFU.

10. The multicore processor-based system of claim 1, wherein the ISR prefetch request further comprises a prefetch depth indicator to indicate a number of instructions to be prefetched.

11. The multicore processor-based system of claim 7, wherein the ISR prefetch control circuit is configured to be selectively enabled by the multicore processor-based system.

12. The multicore processor-based system of claim 7, wherein the shared cache comprises a shared Level 3 (L3) cache.

13. The multicore processor-based system of claim 1 integrated into an integrated circuit (IC).

14. The multicore processor-based system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

15. A multicore processor-based system for providing interrupt service routine (ISR) prefetching, comprising:
   a means for receiving an interrupt request (IRQ) identifier corresponding to an interrupt directed to a target processor element (PE) of a plurality of PEs;
   a means for fetching an ISR pointer for an ISR corresponding to the IRQ identifier;
   a means for selecting a prefetch PE from the plurality of PEs to perform an ISR prefetch on behalf of the target PE; and
   a means for providing an ISR prefetch request, comprising a prefetch start signal and the ISR pointer, to an instruction fetch unit (IFU) of the prefetch PE.

16. A method for providing interrupt service routine (ISR) prefetching, comprising:
   receiving, by an ISR prefetch control circuit from an interrupt controller of a multicore processor-based system, an interrupt request (IRQ) identifier corresponding to an interrupt directed to a target processor element (PE) of a plurality of PEs;
   fetching an ISR pointer for an ISR corresponding to the IRQ identifier;
   selecting a prefetch PE from the plurality of PEs to perform an ISR prefetch on behalf of the target PE; and
   providing an ISR prefetch request, comprising a prefetch start signal and the ISR pointer, to an instruction fetch unit (IFU) of the prefetch PE.

17. The method of claim 16, wherein:
   the plurality of PEs comprises a corresponding plurality of PE instruction prefetch threshold indicators; and
   selecting the prefetch PE comprises:
      identifying one or more PEs of the plurality of PEs as having a current prefetch performance level that is lower than a value of a corresponding PE instruction prefetch threshold indicator; and
      selecting a PE of the one or more PEs having a lowest prefetch performance level as the prefetch PE.

18. The method of claim 17, wherein identifying the one or more PEs is based on data provided by a corresponding one or more performance monitoring units (PMUs) of the multicore processor-based system.

19. The method of claim 17, further comprising:
   determining, by a prefetch monitor circuit of the ISR prefetch control circuit, whether the current prefetch performance level of the prefetch PE while performing a prefetching operation exceeds a value of the corresponding PE instruction prefetch threshold indicator of the prefetch PE; and
   responsive to determining that the current prefetch performance level of the prefetch PE exceeds a value of the corresponding PE instruction prefetch threshold indicator of the prefetch PE, temporarily halting the prefetching operation of the prefetch PE.

20. The method of claim 16, further comprising:
   receiving, by the interrupt controller, the interrupt directed to the target PE of the plurality of PEs;
   determining, by the interrupt controller, the IRQ identifier corresponding to the interrupt; and providing the IRQ identifier to the ISR prefetch control circuit.

21. The method of claim 16, further comprising:
receiving, by the IFU of the prefetch PE, the ISR prefetch request comprising the prefetch start signal and the ISR pointer from the ISR prefetch control circuit;
prefetching, by the IFU of the prefetch PE, the ISR based on the ISR pointer; and
storing, by the IFU of the prefetch PE, the ISR in a shared cache to be accessed by the target PE.

22. The method of claim 21, wherein prefetching the ISR comprises prefetching the ISR by an ISR prefetch circuit.

23. The method of claim 16, wherein the ISR prefetch request further comprises a prefetch depth indicator to indicate a number of instruction cache lines to be prefetched.

* * * * *